US010738175B2

(12) United States Patent
Davidson et al.

(10) Patent No.: US 10,738,175 B2
(45) Date of Patent: Aug. 11, 2020

(54) GLUE SLIME ACTIVATOR AND ASSOCIATED METHODS AND KITS

(71) Applicant: Sanford, L.P., Atlanta, GA (US)

(72) Inventors: Craig Davidson, Cornelius, NC (US); Luanne Armstrong, Pickerington, OH (US); Joseph Wayne Kreft, Atlanta, GA (US); Jennifer Lauren Kroon, Atlanta, GA (US); Bryan Stephen Koepp, Cumming, GA (US); Lien Hoang Phun, Norcross, GA (US); Yanying Chen, Atlanta, GA (US)

(73) Assignee: Sanford, L.P., Atlanta, GA (US)

( * ) Notice: Subject to any disclaimer, the term of this patent is extended or adjusted under 35 U.S.C. 154(b) by 0 days.

(21) Appl. No.: 16/389,327

(22) Filed: Apr. 19, 2019

(65) Prior Publication Data
US 2019/0241714 A1 Aug. 8, 2019

Related U.S. Application Data

(63) Continuation-in-part of application No. 15/998,462, filed on Aug. 15, 2018, now Pat. No. 10,507,399.

(60) Provisional application No. 62/648,256, filed on Mar. 26, 2018, provisional application No. 62/545,867, filed on Aug. 15, 2017.

(51) Int. Cl.
*C08K 3/38* (2006.01)
*C08K 3/32* (2006.01)
*C08K 7/20* (2006.01)
*C08K 3/26* (2006.01)
*C08L 1/28* (2006.01)
*C08L 83/04* (2006.01)
*C09J 129/04* (2006.01)
*C09J 131/04* (2006.01)
*A63H 33/00* (2006.01)

(52) U.S. Cl.
CPC .............. *C08K 3/38* (2013.01); *C08K 3/26* (2013.01); *C08K 3/32* (2013.01); *C08K 7/20* (2013.01); *C08L 1/284* (2013.01); *C08L 83/04* (2013.01); *C09J 129/04* (2013.01); *C09J 131/04* (2013.01); *A63H 33/00* (2013.01); *C08K 2003/262* (2013.01); *C08K 2003/324* (2013.01); *C08K 2003/387* (2013.01); *C08L 2312/00* (2013.01)

(58) Field of Classification Search
CPC . A63H 33/00; C08K 3/22; C08K 3/26; C08K 3/38; C08K 2003/262; C08K 2003/387; C08K 2003/321; C08K 3/32; C09J 131/04; C09J 129/04
See application file for complete search history.

(56) References Cited

U.S. PATENT DOCUMENTS

| | | | |
|---|---|---|---|
| 5,364,892 A | 11/1994 | Miller et al. | |
| 5,711,795 A * | 1/1998 | Browning | C08L 91/06 106/271 |
| 6,143,244 A | 11/2000 | Xia et al. | |
| 6,187,264 B1 | 2/2001 | Osawa et al. | |
| 6,814,886 B1 | 11/2004 | Anderson et al. | |
| 2004/0034042 A1 | 2/2004 | Tsuji et al. | |
| 2009/0175946 A1 * | 7/2009 | Gaissmaier | A61L 24/104 424/484 |
| 2009/0326124 A1 * | 12/2009 | Ikeda | C08J 3/12 524/404 |
| 2010/0011989 A1 * | 1/2010 | Arita | A61K 9/0048 106/217.8 |
| 2011/0091814 A1 * | 4/2011 | Endo | B41C 1/1008 430/302 |
| 2011/0178203 A1 * | 7/2011 | Patel | C09J 175/04 523/122 |
| 2011/0306018 A1 * | 12/2011 | Doyle | A61K 8/347 433/216 |
| 2012/0265657 A1 * | 10/2012 | Smith | G06Q 10/06 705/32 |
| 2014/0312279 A1 | 10/2014 | Cordova | |
| 2015/0196476 A1 * | 7/2015 | Ida | A61K 31/506 514/275 |
| 2017/0105934 A1 * | 4/2017 | Mizutare | A61K 47/02 |

FOREIGN PATENT DOCUMENTS

| | | |
|---|---|---|
| CA | 2451251 A1 | 5/2005 |
| JP | S57123115 A | 7/1982 |
| JP | 2002266285 A | 9/2002 |

OTHER PUBLICATIONS

International Search Report and Written Opinion for International Application No. PCT/US2018/000138 dated Oct. 29, 2018 (16 pages).
Daicel: "Instruction Manual for Chiralpak IA-3, Chiralpak IB-3, Chiralpak IC-3, Chirlpak ID-3, Chiralpak IE-3, Chiralpak IF-3 and Chiralpak IG-3" (3 pages), Jul. 1, 2013.
Graff, Anais, "Complexion of Nickel Ions by Boric Acid or (Poly)borates", Journal of Solution Chemistry, Plenum Publishing, vol. 46, No. 1, Dec. 17, 2016 (20 pages).
Cra-Z-Art Announces Licensing Deal for Nickelodeon Slime, https://www.prnewswire.com/news-releases/cra-z-art-announces-licensing-deal-for-nickelodeon-slime-300418379.html, Mar. 6, 2017.
Green Slime Goo, https://222.stevespanglerscience.com/store/catalog/product/view/id/115 (accessed prior to Aug. 15, 2017) (website no longer active).

* cited by examiner

*Primary Examiner* — Joseph D Anthony
(74) *Attorney, Agent, or Firm* — Eversheds Sutherland (US) LLP

(57) ABSTRACT

Glue slime activator compositions, kits comprising glue slime activator compositions and a glue or adhesive of appropriate functionality for crosslinking, and methods of making glue slime activator compositions are provided herein.

24 Claims, No Drawings

GLUE SLIME ACTIVATOR AND ASSOCIATED METHODS AND KITS

CROSS-REFERENCE TO RELATED APPLICATIONS

This application is a continuation-in-part of U.S. application Ser. No. 15/998,462, filed on Aug. 15, 2018, which claims the benefit of priority to U.S. Provisional Application No. 62/545,867, filed Aug. 15, 2017, and U.S. Provisional Application No. 62/648,256, filed Mar. 26, 2018, each of which are hereby incorporated herein by reference in their entirety.

FIELD OF THE DISCLOSURE

This disclosure relates generally to glue slime activators, and associated methods and kits.

BACKGROUND

Novelty "slime" (e.g., a gelatinous, viscous, mucous like fluid or semi-solid substance) compositions can be produced by combining a poly(vinyl acetate) (PVAc) or poly(vinyl alcohol) (PVOH) based glue with borax. However, borax, in its powder form, is not an approved product for use by children and carries several health and safety warnings, particularly in its concentrated form. An alternative to powdered borax is contact lens solution mixed with baking soda; however, this alternative is costly, requires multiple ingredients in addition to the glue to produce a slime, and is also not approved for use by children.

Thus, there is a need for a further alternative, safer option for making slime from glue.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

In one aspect, a slime activator composition is provided including: a borate ion containing/liberating compound, solution, or salt present in an amount of from about 0.005 percent, by weight, to about 5 percent, by weight or a phosphate ion containing/liberating compound, solution, or salt present in an amount of from about 0.005 percent, by weight, to about 5 percent, by weight; hydroxypropyl methylcellulose; and a buffer present in an amount effective to maintain a pH of the composition in a range of from about 7.5 to about 9.5, wherein the slime activator is configured to crosslink with a polyvinyl acetate-based glue, polyvinyl alcohol-based glue, or other polymeric glue/adhesive and thereby form a slime composition.

In another aspect, a slime activator composition is provided including glass beads, such as silica beads or beads made from silicon or silicon dioxide.

In another aspect, a kit is provided including any of the slime activator compositions described above and a polyvinyl acetate-based glue/adhesive or a polyvinyl alcohol-based glue/adhesive or another polymeric based glue/adhesive of appropriate functionality for crosslinking.

In another aspect, a method of making a slime composition is provided including combining any of the slime activator compositions described above with a polyvinyl acetate-based glue/adhesive or a polyvinyl alcohol-based glue/adhesive or another polymeric based glue/adhesive of appropriate functionality for crosslinking.

In another aspect, a method of making a slime activator composition is provided, including: combining a borate ion containing/liberating compound, solution, or salt in an amount of from about 0.005 percent, by weight, to about 5 percent, by weight or a phosphate ion containing/liberating compound, solution, or salt in an amount of from about 0.005 percent, by weight, to about 5 percent, by weight, with hydroxypropyl methylcellulose, and a buffer in an amount effective to maintain a pH of the composition in a range of about 7.5 to about 9.5, to form a slime activator composition configured to crosslink with a polyvinyl acetate-based glue/adhesive, a polyvinyl alcohol-based glue/adhesive or another polymeric based glue/adhesive of appropriate functionality for crosslinking, and thereby form a slime composition.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

DETAILED DESCRIPTION

Slime activator solutions and compositions have been developed. These slime activator compositions are liquid solutions (e.g., aqueous solutions) or gel-like (e.g., pastes) or solid compositions (e.g., powders, gels) that may be combined with a PVAc or PVOH based glue (e.g., white school glue) or another polymeric glue/adhesive to form a slime composition. The terms "slime activator solution", "slime activator composition", and "slime activator" are generally used interchangeably throughout this description, but it should be understood that such terms are meant to encompass any compositional form of these activator formulations, e.g., liquid, gel, solid.

For example, these activators were found to work similarly to using contact lens solution and baking soda, while also providing a safer alternative to borax or contact solution and baking soda. Contact solutions generally have a pH of from about 5 to about 8, and may include buffering systems which may include boric acid or salts thereof, as described in U.S. Pat. Nos. 6,143,244, and 6,187,264, the entirety of which are hereby incorporated herein by reference. However, contact solutions may be undesirable for use in slime activator compositions and slime compositions, because baking soda must be added to the contact solutions to form a slime activator composition, requiring additional measurement of ingredients, often an untidy process. Similarly, the use of borax presents safety concerns for use by children in slime activator compositions and slime compositions, as the use of borax is limited within the European Union, and banned in Canada and other jurisdictions.

In certain embodiments, the slime activator compositions described herein and slime compositions made using the slime activator compositions described herein may be Art and Creative Materials Institute, Inc. (ACMI) certified as non-toxic for use in a children's product. For example, the slime activators described herein may be deemed non-toxic, such that no health or safety warning labels are required for the product. In some embodiments, the slime activators described herein and slime compositions made using the slime activator compositions described herein may satisfy the European Medicines Agency (EMA) Conformité Européene (CE) safety standards for boron-containing compounds.

In other aspects of the disclosure, methods of making the slime activators are provided. In further aspects, methods of making slime by combining a slime activator with a PVAc or PVOH based glue (or another suitable polymeric glue/adhesive) are provided. In still further aspects, kits containing a slime activator and a PVAc or PVOH based glue (or another suitable polymeric glue/adhesive) are provided.

In certain embodiments, a slime activator contains a borate ion containing/liberating compound, solution, or salt present in an amount of from about 0.005 percent, by weight, to about 5 percent, by weight, and a buffer present in an amount effective to maintain a pH of the solution or composition in a range of about 7.5 to about 9.5. For example, the slime activator may contain a borate ion containing/liberating compound in an amount of about 0.005 wt. %, about 0.010 wt. %, about 0.0115 wt. %, about 0.020 wt. %, about 0.025 wt. %, about 0.030 wt. %, about 0.035 wt. %, about 0.040 wt. %, about 0.045 wt. %, about 0.050 wt. %, about 0.055 wt. %, about 0.060 wt. %, about 0.065 wt. %, about 0.070 wt. %, about 0.075 wt. %, about 0.080 wt. %, about 0.085 wt. %, about 0.090 wt. %, about 0.095 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, about 0.55 wt. %, about 0.60 wt. %, about 0.65 wt. %, about 0.70 wt. %, about 0.75 wt. %, about 0.80 wt. %, about 0.85 wt. %, about 0.90 wt. %, about 0.95 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.4 wt. %, about 4.5 wt. %, about 4.6 wt. %, about 4.7 wt. %, about 4.8 wt. %, about 4.9 wt. %, about 5.0 wt. %, or any ranges therebetween. For example, the slime activator may contain a borate ion containing/liberating compound in an amount of from about 0.05 wt. % to about 0.15 wt. %, for example from about 0.09 wt. % to about 0.10 wt. %. For example, the slime activator may contain a buffer present in an amount effective to maintain a pH of the solution or composition at about 7.5, about 7.6, about 7.7, about 7.8, about.7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, or any ranges therebetween. For example, the slime activator may contain a buffer present in an amount effective to maintain a pH of the solution at a pH of from about 8.5 to about 9.5, for example from about 8.9 to about 9.3.

In certain embodiments, a slime activator contains a phosphate ion containing/liberating compound, solution, or salt present in an amount of from about 0.005 percent, by weight, to about 10 percent, by weight, and a buffer present in an amount effective to maintain a pH of the solution or composition in a range of about 7.0 to about 10.0. For example, the slime activator may contain a phosphate ion containing/liberating compound in an amount of about 0.005 wt. %, about 0.010 wt. %, about 0.0115 wt. %, about 0.020 wt. %, about 0.025 wt. %, about 0.030 wt. %, about 0.035 wt. %, about 0.040 wt. %, about 0.045 wt. %, about 0.050 wt. %, about 0.055 wt. %, about 0.060 wt. %, about 0.065 wt. %, about 0.070 wt. %, about 0.075 wt. %, about 0.080 wt. %, about 0.085 wt. %, about 0.090 wt. %, about 0.095 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, about 0.55 wt. %, about 0.60 wt. %, about 0.65 wt. %, about 0.70 wt. %, about 0.75 wt. %, about 0.80 wt. %, about 0.85 wt. %, about 0.90 wt. %, about 0.95 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.4 wt. %, about 4.5 wt. %, about 4.6 wt. %, about 4.7 wt. %, about 4.8 wt. %, about 4.9 wt. %, about 5.0 wt. %, about 5.1 wt. %, about 5.2 wt. %, about 5.3 wt. %, about 5.4 wt. %, about 5.5 wt. %, about 5.6 wt. %, about 5.7 wt. %, about 5.8 wt. %, about 5.9 wt. %, about 6.0 wt. %, about 6.1 wt. %, about 6.2 wt. %, about 6.3 wt. %, about 6.4 wt. %, about 6.5 wt. %, about 6.6 wt. %, about 6.7 wt. %, about 6.8 wt. %, about 6.9 wt. %, about 7.0 wt. %, about 7.1 wt. %, about 7.2 wt. %, about 7.3 wt. %, about 7.4 wt. %, about 7.5 wt. %, about 7.6 wt. %, about 7.7 wt. %, about 7.8 wt. %, about 7.9 wt. %, about 8.0 wt. %, about 8.1 wt. %, about 8.2 wt. %, about 8.3 wt. %, about 8.4 wt. %, about 8.5 wt. %, about 8.6 wt. %, about 8.7 wt. %, about 8.8 wt. %, about,8.9 wt. %, about 9.0 wt. %, about 9.1 wt. %, about 9.2 wt. %, about 9.3 wt. %, about 9.4 wt. %, about 9.5 wt. %, about 9.6 wt. %, about 9.7 wt. %, about 9.8 wt. %, about 9.9 wt. %, about 10 wt. %, or any ranges therebetween. For example, the slime activator may contain a phosphate ion containing/liberating compound in an amount of from about 0.05 wt. % to about 0.15 wt. %, for example from about 0.09 wt. % to about 0.10 wt. %. For example, the slime activator may contain a buffer present in an amount effective to maintain a pH of the solution or composition at about 7.0, about 7.1, about 7.2, about 7.3, about 7.4, about 7.5, about 7.6, about 7.7, about 7.8, about.7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, or any ranges therebetween. For example, the slime activator may contain a buffer present in an amount effective to maintain a pH of the solution at a pH of from about 8.5 to about 9.5, for example from 8.9 to about 9.3.

In certain embodiments, a slime activator contains both a borate ion containing/liberating compound, solution, or salt and a phosphate ion containing/liberating compound, solution, or salt present in a combined amount of from about 0.005 percent, by weight, to about 10 percent, by weight, and a buffer present in an amount effective to maintain a pH of the solution or composition in a range of about 7.0 to about 11.0. For example, a slime activator composition may contain a borate ion containing/liberating compound, solution, or salt and a phosphate ion containing/liberating compound, solution, or salt in a ratio of about 1:1, about 1:2, about 1:3, about 1:4, or any ranges therebetween.

For example, the slime activator may contain a solvent, such as deionized water. For example, the slime activator may be configured to crosslink with a polyvinyl acetate-based glue/adhesive, a polyvinyl alcohol-based glue/adhesive, or a great many other polymer based adhesives or systems with which the borate ions favorably crosslink with the polymer functional groups of the glue/adhesive, and thereby form a slime composition. As used herein, the phrase "polyvinyl acetate-based glue/adhesive" is used broadly to refer to a glue or adhesive which contains at least about 10 percent, by weight, of a polyvinyl acetate. For example, a polyvinyl acetate-based glue/adhesive includes a glue or adhesive which contains from about 10 percent, by weight, to about 50 percent, by weight, of a polyvinyl acetate. For example, a polyvinyl acetate-based glue/adhesive includes Elmer's® brand No Run School Glue and Elmer's® brand Glue-All adhesives. As used herein, the phrase "polyvinyl alcohol-based glue/adhesive" is used broadly to refer to a glue or adhesive which contains at least 5 percent, by weight, of a polyvinyl alcohol, wherein some portion of the polyvinyl alcohol is partially hydrolyzed. For example, a polyvinyl alcohol-based glue/adhesive includes a glue or adhesive which contains from about 5 percent, by weight, to about 50 percent, by weight, of a polyvinyl alcohol, wherein at least about half of the polyvinyl alcohol is partially hydrolyzed. For example, a polyvinyl alcohol-based glue/adhesive includes Elmer's® brand Clear Glue. As used herein, the phrase "polymer-based glue/adhesive" is used broadly to refer to a glue or adhesive which contains at least 10 percent, by weight, of one or more polymers. For example, a polymer-based glue/adhesive includes a glue or adhesive which contains from about 10 percent, by weight, to about 95 percent, by weight, of one or more polymers. For example, a polymer-based glue/adhesive includes Elmer's® brand translucent glues, opaque glues, and glow in the dark glues. This crosslinking may occur with or without the presence of a thermal or chemical catalytic influence. As used herein, the term "about" is used to refer to plus or minus 5 percent of the numerical value of the number with which it is being used.

In some embodiments, the buffer is present in an amount effective to maintain the pH of the solution/composition at about 9. For example, the buffer may be sodium hydroxide (e.g., in aqueous solution, such as 2.5% aqueous solution or 25.0% aqueous solution), sodium bicarbonate, sodium chloride, sodium hydrogen phosphate, and/or any hydroxide salts of alkali or alkaline earth metals, such as calcium hydroxide and potassium hydroxide. For example, the buffer may be present in the solution in an amount of from about 0.01 percent to about 40 percent, by weight, such as from about 0.05 percent to about 7 percent, by weight, or from about 5 percent to about 6 percent, by weight. For example, the buffer may be present in the solution in an amount of about 0.01 wt. %, about 0.05 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, about 0.55 wt. %, about 0.60 wt. %, about 0.65 wt. %, about 0.70 wt. %, about 0.75 wt. %, about 0.80 wt. %, about 0.85 wt. %, about 0.90 wt. %, about 0.95 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, about 4.1 wt. %, about 4.2 wt. %, about 4.3 wt. %, about 4.4 wt. %, about 4.5 wt. %, about 4.6 wt. %, about 4.7 wt. %, about 4.8 wt. %, about 4.9 wt. %, about 5.0 wt. %, about 5.1 wt. %, about 5.2 wt. %, about 5.3 wt. %, about 5.4 wt. %, about 5.5 wt. %, about 5.6 wt. %, about 5.7 wt. %, about 5.8 wt. %, about 5.9 wt. %, about 6.0 wt. %, about 6.1 wt. %, about 6.2 wt. %, about 6.3 wt. %, about 6.4 wt. %, about 6.5 wt. %, about 6.6 wt. %, about 6.7 wt. %, about 6.8 wt. %, about 6.9 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, about 20.5 wt. %, about 21.0 wt. %, about 21.5 wt. %, about 22.0 wt. %, about 22.5 wt. %, about 23.0 wt. %, about 23.5 wt. %, about 24.0 wt. %, about 24.5 wt. %, about 25.0 wt. %, about 25.5 wt. %, about 26.0 wt. %, about 26.5 wt. %, about 27.0 wt. %, about 27.5 wt. %, about,28.0 wt. %, about 28.5 wt. %, about 29.0 wt. %, about 29.5 wt. %, about 30.0 wt. %, about 30.5 wt. %, about 31.0 wt. %, about 31.5 wt. %, about 32.0 wt. %, about 32.5 wt. %, about 33.0 wt. %, about 33.5 wt. %, about 34.0 wt. %, about 34.5 wt. %, about 35.0 wt. %, about 35.5 wt. %, about 36.0 wt. %, about 36.5 wt. %, about 37.0 wt. %, about 37.5 wt. %, about 38.0 wt. %, about 38.5 wt. %, about 39.0 wt. %, about 39.5 wt. %, about 40.0 wt. %, or any ranges therebetween.

In some embodiments, the slime activator composition may further include a pH modifier. For example, in some embodiments the slime activator composition may contain triethanolamine. Without intending to be bound by any particular theory, it is believed that slime activator compositions containing triethanolamine more effectively crosslink a polymeric glue or adhesive to form a slime composition. In some embodiments, triethanolamine is present in the composition in an amount of from about 0.005 wt. % to about 4 wt. %, for example about 0.005 wt. %, about 0.01 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4.0 wt. %, or any ranges therebetween.

As used herein, a "borate ion containing/liberating compound, solution, or salt" refers to a compound, solution, or salt which contains or which, when mixed with a solvent, liberates or produces borate ions. For example, the borate ion containing/liberating compound, solution, or salt may be boric acid, sodium borate, sodium tetraborate, disodium tetraborate, sodium tetraborate decahydrate, and/or any salts of alkali or alkaline each metals, such as calcium chloride and potassium chloride. In some embodiments, the borate ion containing/liberating compound, solution, or salt is present in an amount of from about 0.005 percent, by weight, to about 0.5 percent, by weight. For example, the borate ion-containing/liberating compound, solution, or salt may be present in an amount of from about 0.005 percent, by weight, to about 0.1 percent, by weight. For example, the borate ion containing/liberating compound, solution, or salt may be present in an amount of from about 0.0075 percent, by weight, to about 0.03 percent, by weight, or an amount of from about 0.9 percent, by weight, to about 0.99 percent, by weight.

As used herein, a "phosphate ion containing/liberating compound, solution, or salt" refers to a compound, solution, or salt which contains or which, when mixed with a solvent, liberates or produces phosphate ions. For example, the phosphate ion containing/liberating compound, solution, or salt may be phosphoric acid, monosodiumsodium phosphate, disodium phosphate, trisodium phosphate, monosodium diphosphate, disodium diphosphate, trisodiumdiphosphate, tetrasodium diphosphate, and/or any salts of alkali or alkaline each metals, such as calcium chloride and potassium chloride. In some embodiments, the phosphate ion containing/liberating compound, solution, or salt is present in an amount of from about 0.005 percent, by weight, to about 0.5 percent, by weight. For example, the phosphate ion-containing/liberating compound, solution, or salt may be present in an amount of from about 0.005 percent, by weight, to about 0.1 percent, by weight. For example, the phosphate ion containing/liberating compound, solution, or salt may be present in an amount of from about 0.0075 percent, by weight, to about 0.03 percent, by weight, or an amount of from about 0.9 percent, by weight, to about 0.99 percent, by weight.

In certain embodiments, the slime activator does not contain a boron containing/liberating compound, solution, or salt, or a phosphate containing/liberating compound, solution, or salt, but rather contains glass beads. In certain embodiments, the slime activator contains both glass beads and a boron containing/liberating compound, solution, or salt, or a phosphate containing/liberating compound, solution, or salt. Without wishing to be bound by any particular theory, it is believed that the glass beads effectively crosslink with a polyvinyl acetate-based glue, a polyvinyl alcohol-based glue, or other adhesive or functionalized polymer network, and thereby form a slime composition. In some embodiments, the glass beads are substantially spherical, and have an average diameter of from about 5 µm to about 45 µm, for example about 5 µm, about 10 µm, about 15 µm, about 20 µm, about 25 µm, about 30 µm, about 35 µm, about 40 µm, about 45 µm, or any ranges therebetween. In some embodiments, the glass beads may be present in the slime activator composition in an amount of from about 0.01 wt. % to about 35 wt. %, for example about 0.01 wt. %, about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, about 20.5 wt. %, about 21.0 wt. %, about 21.5 wt. %, about 22.0 wt. %, about 22.5 wt. %, about 23.0 wt. %, about 23.5 wt. %, about 24.0 wt. %, about 24.5 wt. %, about 25.0 wt. %, about 25.5 wt. %, about 26.0 wt. %, about 26.5 wt. %, about 27.0 wt. %, about 27.5 wt. %, about 28.0 wt. %, about 28.5 wt. %, about 29.0 wt. %, about 29.5 wt. %, about 30.0 wt. %, about 30.5 wt. %, about 31.0 wt. %, about 31.5 wt. %, about 32.0 wt. %, about 32.5 wt. %, about 33.0 wt. %, about 33.5 wt. %, about 34.0 wt. %, about 34.5 wt. %, about 35.0 wt. %, or any ranges therebetween.

In some embodiments, the slime activator composition contains one or more additives. For example, the slime activator compositions may contain one or more additives to affect the texture, feel, color, or look of the slime activator composition and slime compositions made therefrom.

In certain embodiments, the slime activator composition also contains a thickener (i.e., a rheology modifier). For example, the thickener may contain hydroxypropyl methylcellulose, methylcellulose, xanthan gum, starch cellulose, alginate, egg yolk, agar, arrowroot, carageenan, collagen, gelatin, guar gum, and/or pectin. The thickener may also be a synthetic thickener, such as synthetic acrylic-based polymers (e.g., alkali-swellable (or soluble) emulsions (ASE's) hydrophobically modified alkali-swellable emulsions (HASE's) and hydrophobically modified, methoxylated urethane resins (HEUR's)). For example, a suitable thickener may be present in the composition in an amount of from about 0.05 percent, by weight to about 20 percent, by weight, such as from about 0.1 percent, by weight, to about 2 percent, by weight, or from about 0.5 percent, by weight, to about 1 percent, by weight. For example, a thickener may be present in the composition in an amount of about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, or any ranges therebetween.

In certain embodiments, the slime activator contains a polyol. For example, in some embodiments the slime activator contains glycerol, propylene glycol, or a combination thereof. Without intending to be bound by any particular theory, it is believed that glycerol functions as a rheology modifier or plasticizer in slime compositions. It has been observed that slime compositions containing glycerol result in a smoother texture, which is silky or velvety. In some embodiments, the slime activator composition contains glycerol present in an amount of from about 1 wt. % to about 10 wt. %, for example about 1 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any ranges therebetween.

In certain embodiments, the slime activator composition also contains a biocide or fungicide, such as Acticide B20. The biocide or fungicide may be present in the slime activator composition in an amount of from about 0.001 percent, by weight, to about 0.5 percent, by weight, such as from about 0.001 percent, by weight, to about 0.3 percent, by weight, for example about 0.001 wt. %, about 0.005 wt. %, about 0.01 wt. %, about 0.05 wt. %, about 0.10 wt. %, about 0.15 wt. %, about 0.20 wt. %, about 0.25 wt. %, about 0.30 wt. %, about 0.35 wt. %, about 0.40 wt. %, about 0.45 wt. %, about 0.50 wt. %, or any ranges therebetween.

In certain embodiments, the slime activator composition further contains one or more agents to provide one or more tactile or aesthetic properties to the resultant slime material. For example, the agents(s) may be selected to provide a particular color, a color-changing quality, a texture, a foamy or other tactile feel, a metallic finish, a particular smell, the ability to release snow-like particles when stretched, and/or a glow-in-the-dark quality. Such agents may be provided in an amount suitable to provide the desired property, such as amounts of from about 0.01 percent to about 25 percent, by weight of the composition, such as from about 0.1 percent to about 10 percent, by weight of the composition, or from about 0.1 percent to about 2 percent, by weight of the composition.

In some embodiments, the slime activator composition contains one or more colored pigments to provide a desired color to the resulting slime. Suitable pigments or colorants are known in the industry. For example, in some embodiments suitable pigments or colorants may include food coloring, chalk, paint, and the like.

For example, the composition may contain a thermochromic agent configured to change the color of the resulting slime material in response to a change in temperature. For example, the thermochromic agent may be a thermochromic pigment configured to change color based on the temperature to which it is exposed. The thermochromic pigment may be cold-activated or hot-activated. For example, cold-activated thermochromic pigments may be activated at about 18 to about 22° C., such that they change color once the material gets colder than the activation temperature. For example, cold-activation may be accelerated by a user by exposing the slime material to a cold material, such as ice. For example, hot-activated thermochromic pigments may be activated at about 31° C., such that they change color once the temperature gets hotter. For example, hot activation may be accelerated by a user by friction/heat from the hand or an external heat source.

Suitable thermochromic pigments may include those described in U.S. Provisional Patent Application No. 62/596,213, filed Dec. 8, 2017, the disclosure of which is incorporated by reference herein in its entirety. For example, the thermochromic pigment (also referred to as a "colorant") may include an encapsulated electron-donating color-developing organic compound, an electron-accepting organic compound, and a reaction medium. For example, in some embodiments the composition may include microcapsules having an acrylic shell and a core of encapsulated leuco dye, a weak organic acid, and a solvent or wax. In some embodiments, the thermochromic colorant is DW0602171, or DW0607171, both available from Encapsys, LLC, or any combination thereof. In some embodiments, thermochromic colorants are those commercially available from LCR Hallcrest in black, blue, magenta, green, orange, red, purple, brown, and turquoise, or any combinations thereof. For example, in some embodiments, the composition includes one or more commercially-available colorants from Encapsys, such as DW0925171, a blue thermochromic colorant; DW0927171, a blue thermochromic colorant; DW09271712, a green thermochromic colorant; DW0928171, a green thermochromic colorant; DW0928172, a yellow thermochromic colorant; DW0929171, a yellow thermochromic colorant; DW1002171, a black thermochromic colorant; DW1002172, a black thermochromic colorant; DW100417; a red thermochromic colorant; DW1004172, a red thermochromic colorant; DW1005171, a blue thermochromic colorant; DW1005172, a blue thermochromic colorant; DW1009171, a red thermochromic colorant; DW1009172, a red thermochromic colorant, or any combinations thereof.

In certain embodiments, the slime activator composition contains an agent configured to yield a textured, foamy or other tactile feel in the resultant slime composition. For example, a foaming agent may be included in the composition to provide the desired slime texture. In some embodiments, the foaming agent is foam beads, such as expanded polystyrene foam beads. In some embodiments, the slime activator composition contains a clay, such as a soft polymer clay, to achieve a smooth textured slime. In some embodiments, the slime activator composition contains glass beads, polymer beads, such as polypropylene beads, or other suitable material beads, to provide a textured feel in the resultant slime composition. For example, in some embodiments, the slime activator composition includes one or more agents configured to yield a particular tactile feel or texture in the resultant slime composition by lubricating the composition, decreasing the surface tension of the slime composition, adding body to the composition, imparting a skin conditioning layer to the skin of a user when mixing or handling the slime composition, adjusting the elastic modulus of the resulting slime composition, or any combinations thereof.

For example, in some embodiments, the slime activator composition contains a lubricating component or a surfactant. Lubricating components may include, for example, steric acid, waxes, slip agents, silicone-based additives, oils, or surfactants. Without intending to be bound by any particular theory, it is believed that, when used in slime activator compositions, steric acid may increase the smoothness of slime compositions made using these slime activator compositions by acting as a lubricating component which allows for an increased squeezability. In some embodiments, squeezability may be measured by a squeezability apparatus, which is designed to measure the amount of work required to pass a grate having spaces of about 1 cm, ±0.75 cm, roughly equivalent in size to a human hand or fingers, depending on the type and size of human hand being modeled in the test, through a slime composition. Surfactants may include, polyoxyethers of lauryl alcohol, for example, ETHAL® laureth-23, available from Ethox Chemicals; sodium lauryl sulfate, non-ionic surfactants, for example, Triton™ X-100, available from Sigma-Aldrich, polyethoxylated alcohols, polyoxyethylene sorbitan, N,N-dimethyldodecylamine-N-oxide, cetyltrimethylammonium bromide, polysorbates, nonylphenol ethoxylate, polyoxyl castor oil, and any combinations thereof. Without intending to be bound by any particular theory, it is believed that surfactants, when included in slime activator compositions, may serve to increase the smoothness of slime compositions made using these slime activator compositions by decreasing the surface tension of the slime compositions. For example, without intending to be bound by any particular theory, it is believed that surfactants increase the volumetric expansion of slime compositions by decreasing the surface tension of the slime compositions.

In some embodiments, lubricating components may be present in the slime activator composition in an amount of from about 0.5 wt. % to about 40 wt. %, for example about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, about 20.5 wt. %, about 21.0 wt. %, about 21.5 wt. %, about 22.0 wt. %, about 22.5 wt. %, about 23.0 wt. %, about 23.5 wt. %, about 24.0 wt. %, about 24.5 wt. %, about 25.0 wt. %, about 25.5 wt. %, about 26.0 wt. %, about 26.5 wt. %, about 27.0 wt. %, about 27.5 wt. %, about 28.0 wt. %, about 28.5 wt. %, about 29.0 wt. %, about 29.5 wt. %, about 30.0 wt. %, about 30.5 wt. %, about 31.0 wt. %, about 31.5 wt. %, about 32.0 wt. %, about 32.5 wt. %, about 33.0 wt. %, about 33.5 wt. %, about 34.0 wt. %, about 34.5 wt. %, about 35.0 wt. %, about 35.5 wt. %, about 36.0 wt. %, about 36.5 wt. %, about 37.0 wt. %, about 37.5 wt. %, about 38.0 wt. %, about 38.5 wt. %, about 39.0 wt. %, about 39.5 wt. %, about 40.0 wt. %, or any ranges therebetween.

In some embodiments, surfactants (e.g., solutions containing surfactants) may be present in the slime activator composition in an amount of from about 0.01 wt. % to about 20 wt. %, for example about 0.01 wt. %, about 0.1 wt. %, about 0.2 wt. %, about 0.3 wt. %, about 0.4 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, or any ranges therebetween.

For example, in some embodiments, an aqueous solution of polyoxyethers of lauryl alcohol, such as Ethal® Laureth-23, containing from about 1 wt. % to about 10 wt. % polyoxyethers of lauryl alcohol may be present in the slime activator composition in an amount of from about 0.01 wt. % to about 3 wt. %, for example about 0.01 wt. %, about 0.05 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, or any ranges therebetween.

For example, in some embodiments, an aqueous solution of sodium lauryl sulfate containing from about 0.5 wt. % to about 10 wt. % of sodium lauryl sulfate may be present in the slime activator composition in an amount of from about 0.01 wt. % to about 4 wt. %, for example about 0.01 wt. %, about 0.05 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2.0 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3.0 wt. %, about 3.1 wt. %, about 3.2 wt. %, about 3.4 wt. %, about 3.5 wt. %, about 3.6 wt. %, about 3.7 wt. %, about 3.8 wt. %, about 3.9 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any ranges therebetween.

For example, in some embodiments, an aqueous solution of a non-ionic surfactant, such as Triton™ X-100, containing from about 15 wt. % to about 35 wt. % of non-ionic surfactant, may be present in the slime activator composition in an amount of from about 0.1 wt. % to about 10 wt. %, for example about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any ranges therebetween.

In some embodiments, lignocellulosic fibrous material may be present in the slime activator composition. In some embodiments, the lignocellulosic fibrous material is paper pulp. In some embodiments, the lignocellulosic fibrous material may include fibers having an average length of from about 0.1 mm to about 10 mm, for example about 0.1 mm, about 0.5 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, about 6.5 mm, about 7.0 mm, about 7.5 mm, about 8.0 mm, about 8.5 mm, about 9.0 mm, about 9.5 mm, about 10.0 mm, or any ranges therebetween. In some embodiments, the fibers may be derived from a tree, such as a wide-leafed tree or a conifer. Without intending to be bound by any particular theory, it is believed that lignocellulosic fibrous material may give the slime "body" and improve its soft or buttery texture, and may alternatively serve as a drying agent. In some embodiments, lignocellulosic fibrous material may be present in the slime activator composition in an amount of from about 0.5 wt. % to about 40 wt. %, for example about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, about 20.5 wt. %, about 21.0 wt. %, about 21.5 wt. %, about 22.0 wt. %, about 22.5 wt. %, about 23.0 wt. %, about 23.5 wt. %, about 24.0 wt. %, about 24.5 wt. %, about 25.0 wt. %, about 25.5 wt. %, about 26.0 wt. %, about 26.5 wt. %, about 27.0 wt. %, about 27.5 wt. %, about 28.0 wt. %, about 28.5 wt. %, about 29.0 wt. %, about 29.5 wt. %, about 30.0 wt. %, about 30.5 wt. %, about 31.0 wt. %, about 31.5 wt. %, about 32.0 wt. %, about 32.5 wt. %, about 33.0 wt. %, about 33.5 wt. %, about 34.0 wt. %, about 34.5 wt. %, about 35.0 wt. %, about 35.5 wt. %, about 36.0 wt. %, about 36.5 wt. %, about 37.0 wt. %, about 37.5 wt. %, about 38.0 wt. %, about 38.5 wt. %, about 39.0 wt. %, about 39.5 wt. %, about 40.0 wt. %, or any ranges therebetween.

In some embodiments, an excipient composite may be present in the slime activator composition. For example, in some embodiments, the excipient composite may contain one or more of a cellulose binder, a disintegrant, and a glidant. In some embodiments, the glidant may include one or more stearates, such as magnesium stearate or magnesium carbonate, colloidal silicon oxides, starches, talcs, silica gel, fumed silica, SYLOID® 244 FP, a silica carrier available from Grace Materials Technologies, and SYLOID® XDP, a silica carrier available from Grace Materials Technologies, or any combinations thereof. In some embodiments, the disintegrant may include croscarmellose sodium, carboxymethylcellulose variants, modified starches, modified amylum, glycosides, or any combinations thereof. Without intending to be bound by any particular theory, it is believed that the excipient composite may provide body to a slime composition, and may act as a hygroscopic, solubility-enhancing agent. For example, without intending to be bound by any particular theory, it is believed that the excipient composite may improve flow of the slime activator composition out of a container, and may reduce the dry time of a slime composition. For example, in some embodiments, reducing the dry time of a slime composition may enable the formation of an "iceberg" slime, in which an outer layer dries to form a breakable layer over the slime. In some embodiments, the excipient composite may be present in the slime activator composition in an amount of from about 0.05 wt. % to about 50 wt. %, such as from about 0.1 wt. % to about 21.0 wt. %, for example about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, about 20.0 wt. %, about 20.5 wt. %, about 21.0 wt. %, about 21.5 wt. %, about 22.0 wt. %, about 22.5 wt. %, about 23.0 wt. %, about 23.5 wt. %, about 24.0 wt. %, about 24.5 wt. %, about 25 wt. %, about 25.5 wt. %, about 26.0 wt. %, about 26.5 wt. %, about 27.0 wt. %, about 27.5 wt. %, about 28.0 wt. %, about 28.5 wt. %, about 29.0 wt. %, about 29.5 wt. %, about 30.0 wt. %, about 30.5 wt. %, about 31.0 wt. %, about 31.5 wt. %, about 32.0 wt. %, about 32.5 wt. %, about 33.0 wt. %, about 33.5 wt. %, about 34.0 wt. %, about 34.5 wt. %, about 35.0 wt. %, about 35.5 wt. %, about 36.0 wt. %, about 36.5 wt. %, about 37.0 wt. %, about 37.5 wt. %, about 38.0 wt. %, about 38.5 wt. %, about 39.0 wt. %, about 39.5 wt. %, about 40.0 wt. %, about 40.5 wt. %, about 41.0 wt. %, about 41.5 wt. %, about 42.0 wt. %, about 42.5 wt. %, about 43.0 wt. %, about 43.5 wt. %, about 44.0 wt. %, about 44.5 wt. %, about 45.0 wt. %, about 45.5 wt. %, about 46.0 wt. %, about 46.5 wt. %, about 47.0 wt. %, about 47.5 wt. %, about 48.0 wt. %, about 48.5 wt. %, about 49.0 wt. %, about 49.5 wt. %, about 50 wt. %, or any ranges therebetween.

For example, in some embodiments, a silicone emulsion is present in the slime activator composition. In some embodiments, the silicone emulsion is a non-ionic polydimethylsiloxane emulsion with a viscosity range of from about 300 centistokes to about 400 centistokes, a percent solids value of about 60%, and a pH greater than about 8.4. For example, in some embodiments the silicone emulsion is ICM 1670E, ICM 1670K, or ICM 1670L, each available from ICM Products Inc. Without intending to be bound by any particular theory, it is believed that a silicone emulsion, when used in slime compositions, may impart a skin conditioning layer when the slime is used or mixed by a user, and thereby decrease the residual adhesion that is known to occur on the hands of a user when using many different types of slime compositions. In some embodiments, the silicone emulsion is present in the slime activator composition in an amount of from about 1 wt. % to about 70 wt. %, for example about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, or any ranges therebetween.

In certain embodiments, the slime activator composition contains pearlescent pigments, to provide a metallic finish for the resultant slime. For example, the pearlescent pigments may contain micronized titanium dioxide, metal oxide coated mica, metal oxide coated alumina, metal oxide coated silica, basic lead carbonate, bismuth oxychloride, and/or natural fish silver. In certain embodiments, the slime activator composition may contain glitter, glitter pigment, glitter crystals, confetti, plastic or metallic beads, or other suitable resins, or polymers.

In certain embodiments, the slime activator composition contains sand, to provide a sandy look and feel for the resultant slime. In particular, larger particle size sand, such as sand having an average particle size of greater than about 250 microns, may be added to the slime activator composition to increase the gritty feel of the resultant slime.

In certain embodiments, the slime activator composition contains magnetic additives, to provide a magnetic quality for the resultant slime. For example, the magnetic additives may include iron filling, iron powder, or another magnetic powder, such as iron oxide or encapsulated iron oxide. For example, in some embodiments the slime activator composition may include micro-encapsulated black iron oxide particles, such as Inner Black 1 & 2, available from Erfal Group. In some embodiments, the slime activator compositions containing encapsulated black iron oxide particles are washable. In some embodiments, the encapsulated black iron oxide particles are designed to rupture upon mixing to form a slime composition, and may cause a color change to the resulting slime composition. For example, before mixing, the slime activator composition may be white or gray in color, and upon mixing into a slime composition, the color may change to dark gray or black. In some embodiments, encapsulated or unencapsulated iron particles are present in the slime activator composition in an amount of from about 15 wt. % to about 65 wt. %, for example from about 30 wt. % to about 45 wt. %, for example about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, and any ranges therebetween.

In certain embodiments, the slime activator composition contains photo luminescent, photochromic, fluorescent, or phosphorescent pigments or dyes that provide a glow-in-the-dark or light-driven color change quality to the resultant slime. Such pigments may be those known in the industry for such purposes.

For example, the slime activator composition may contain a suitable photochromic (or reverse photochromic) material, such as one or more materials as described in U.S. Provisional Applications No. 62/565,853, filed Sep. 29, 2017, No. 62/565,810, filed Sep. 29, 2017, No. 62/565,880, filed Sep. 29, 2017, and No. 62/596,211, filed Dec. 8, 2017, the disclosures of which are incorporated by reference herein in their entirety. For example, the reverse photochromic colorants may include a photochromic dye and an activator or bleaching agent which renders the dye colorless upon exposure to UV light. For example, reverse photochromic colorants manufactured by Spectra Group Ltd., including: CR234-BT2B, CR234-R33, CR234-R33x2, and CR234-V4, may be used as reverse photochromic colorants in embodiments of ink formulations of the present disclosure. The CR234-BT2B colorant is initially blue and, upon exposure to UV light, transitions from blue to clear. The CR234-R33 and CR234-R33x2 colorants are initially red and, upon exposure to UV light, transition from red to clear. The CR234-V4 colorant is initially violet and, upon exposure to UV light, transitions from violet to clear.

In certain embodiments, the slime activator composition contains fragrance-providing chemistry, such as a fragrance oil or other scented material. For example, the slime activator composition may contain one or more essential oils.

It should be understood that while the additives/agents discussed herein are primarily discussed as being contained in the slime activator composition, many of these additives may similarly be contained in the glue formulation itself and provide a similar result in slime formulation. Thus, this disclosure should be understood as encompassing activator and glue formulations containing such additives, to the extent such additives do not negate any necessary properties of the compositions.

In certain embodiments, the slime activator solution or composition is Art and Creative Materials Institute, Inc. (ACMI) certified as non-toxic for use in a children's product.

In certain embodiments, a kit contains a slime activator solution or composition as described herein and a polyvinyl acetate-based glue, a polyvinyl alcohol-based glue, or another suitable polymeric glue/adhesive (e.g., a white school glue, such as ELMER'S® brand School Glue). In certain embodiments, a method of making a slime composition includes combining a slime activator solution or composition as described herein with a polyvinyl acetate-based glue or a polyvinyl alcohol-based glue. For example, the slime activator solution/composition and the polymeric based glue/adhesive may be combined in a weight ratio of from about 0.25 activator to 1.0 glue up to about 1.5 activator to 1.0 glue. For example, about 4 ounces of Elmer's® White School glue may be combined with about 1.9 ounces of activator solution, or about 5 ounces of Elmer's® Clear School Glue may be combined with about 2.3 ounces of activator solution.

In certain embodiments, the kit includes one or more additional additives designed to be combined with the slime activator solution/composition and polymeric based glue/adhesive. For example, in some embodiments, the kit may include one or more additives designed to allow the slime composition to release particles when stretched, such as INSTA-SNOW® polymer, or other water absorbing and expanding materials. For example, in some embodiments the kit may include sodium polyacrylates, superabsorbing materials, hydrophilic materials, or other polymers which have an affinity for water. Without intending to be bound by any particular theory, it is believed that, in order to function as an effective snow additive, the materials strike a balance between absorbing enough water to increase in volume, without absorbing so much water that the additive will precipitate from the slime composition in large pieces which may physical fall out of the slime composition when handling. Without intending to be bound by any particular theory, it is believed that other factors such as purity of the water used in the slime activator composition, ionic strength of the slime activator composition, and the degree of cross linking in the slime composition, affect the effectiveness of the additive. In some embodiments, the kits may contain from about 5 to about 20 grams of an additive designed to allow the slime composition to release particles when stretched, for example about 5 grams, about 6 grams, about 7 grams, about 8 grams, about 9 grams, about 10 grams, about 11 grams, about 12 grams, about 13 grams, about 14 grams, about 15 grams, about 16 grams, about 17 grams, about 18 grams, about 19 grams, about 20 grams, or any ranges therebetween.

In certain embodiments, a method of making a slime activator solution includes combining a borate ion-containing compound in an amount of from about 0.005 percent, by weight, to about 5 percent, by weight, with a buffer in an amount effective to maintain a pH of the solution in a range of about 8 to about 9.5, to form a slime activator solution configured to crosslink with a polyvinyl acetate-based glue or a polyvinyl alcohol-based glue and thereby form a slime composition. Other methods may include any of the additional details provided above in regards to the slime activator solutions.

It has been discovered that the presently described solutions/compositions which contain borate ion-containing/liberating compositions minimize the amount of borate ions needed to effectively crosslink the polymer in the glue to form the slime, therefore keeping the mixture to safe levels of borate so as not to trigger warnings and concern and allow it to be sold as a children's product. Further, it has been discovered that creating a high pH environment also tends to aid the crosslinking reaction, requiring lower amounts of borate ion. For example, it was found that the pH environment of the solution is important in the efficacy of the solution, with a pH of about 7.5 to about 9.5 working well. Additionally, it was found that inclusion of a thickener, such as described above, resulted in a thickening of the solution and this allowed the slime to be formed using a lower percent by weight of the borate ion-containing/liberating compound.

For example, a generalized reaction of a PVOH based glue/adhesive with borate ions is shown below.

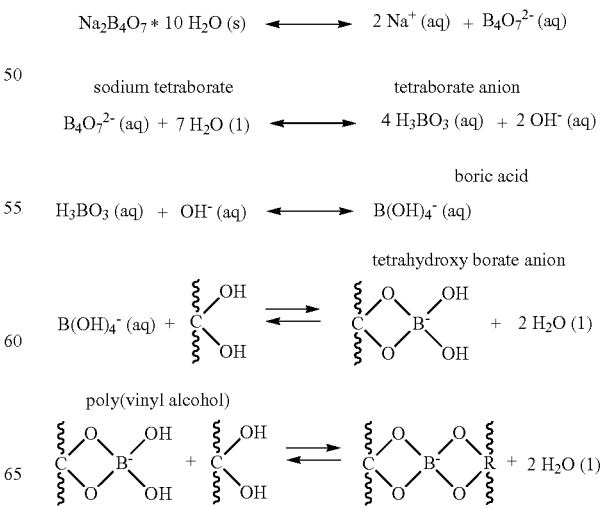

-continued

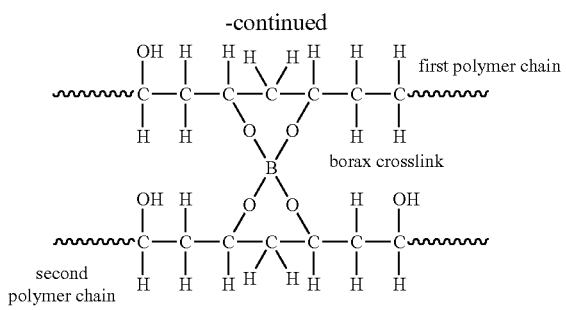

EXAMPLES

Embodiments of the present disclosure may be better understood by reference to the following examples.

Example 1

Prophetic Examples of Slime Activator Compositions

Example component ranges for certain embodiments of slime activator solutions/compositions are given in Table 1 below.

TABLE 1

Example Slime Activator Formulations

| Raw Material | Composition Range (weight %) |
| --- | --- |
| Deionized water | 65-95 |
| Boric Acid | 0.005-5.0 |
| Hydroxypropyl methylcellulose | 0.1-3.0 |
| Sodium Hydroxide (2.5% Aq. Soln.) | 2.5-7.0 |
| Sodium Bicarbonate | 0.05-7.0 |
| Acticide B20 | 0.05-0.25 |

Thus, the slime activator solutions/compositions described herein were discovered to crosslink the PVAc and PVOH polymer systems in glue/adhesive to form a slime that meets expectations while limiting the amount of borate ions present in the solution.

Additional example components ranges for certain embodiments of slime activator solutions/compositions containing certain of the additives described herein are given in Tables 2-7 below.

TABLE 2

Example Slime Activator Formulations Containing Thermochromic Pigments

| Raw Material | Composition Range (weight %) |
| --- | --- |
| Deionized water | 65-95 |
| Boric Acid | 0.005-5.0 |
| Hydroxypropyl methylcellulose | 0.1-3.0 |
| Sodium Hydroxide | (2.5% Aq. Soln.) 2.5-7.0 |
| Sodium Bicarbonate | 0.05-7.0 |
| Thermochromic pigments | 0.01-25% |
| Acticide B20 | 0.05-0.25 |

TABLE 3

Example Slime Activator Formulations Containing Foam Beads

| Raw Material | Composition Range (weight %) |
| --- | --- |
| Deionized water | 65-95 |
| Boric Acid | 0.005-5.0 |
| Hydroxypropyl methylcellulose | 0.1-3.0 |
| Sodium Hydroxide | (2.5% Aq. Soln.) 2.5-7.0 |
| Sodium Bicarbonate | 0.05-7.0 |
| Foam Beads | 0.01-25% |
| Acticide B20 | 0.05-0.25 |

TABLE 4

Example Slime Activator Formulations Containing Pearlescent Pigments

| Raw Material | Composition Range (weight %) |
| --- | --- |
| Deionized water | 65-95 |
| Boric Acid | 0.005-5.0 |
| Hydroxypropyl methylcellulose | 0.1-3.0 |
| Sodium Hydroxide | (2.5% Aq. Soln.) 2.5-7.0 |
| Sodium Bicarbonate | 0.05-7.0 |
| Pearlescent Pigments | 0.01-25% |
| Acticide B20 | 0.05-0.25 |

TABLE 5

Example Slime Activator Formulations Containing Glow-in-the-Dark Pigments

| Raw Material | Composition Range (weight %) |
| --- | --- |
| Deionized water | 65-95 |
| Boric Acid | 0.005-5.0 |
| Hydroxypropyl methylcellulose | 0.1-3.0 |
| Sodium Hydroxide | (2.5% Aq. Soln.) 2.5-7.0 |
| Sodium Bicarbonate | 0.05-7.0 |
| Glow in the dark/photochromic pigments | 0.01-25% |
| Acticide B20 | 0.05-0.25 |

TABLE 6

Example Slime Activator Formulations Containing Glitter

| Raw Material | Composition Range (weight %) |
| --- | --- |
| Deionized water | 65-95 |
| Boric Acid | 0.005-5.0 |
| Hydroxypropyl methylcellulose | 0.1-3.0 |
| Sodium Hydroxide | (2.5% Aq. Soln.) 2.5-7.0 |
| Sodium Bicarbonate | 0.05-7.0 |
| Glitter | 0.01-25% |
| Acticide B20 | 0.05-0.25 |

TABLE 7

Example Slime Activator Formulations Containing Photochromic Pigments

| Raw Material | Composition Range (weight %) |
| --- | --- |
| Deionized water | 65-95 |
| Boric Acid | 0.005-5.0 |
| Hydroxypropyl methylcellulose | 0.1-3.0 |

TABLE 7-continued

Example Slime Activator Formulations Containing Photochromic Pigments

| Raw Material | Composition Range (weight %) |
|---|---|
| Sodium Hydroxide | (2.5% Aq. Soln.) 2.5-7.0 |
| Sodium Bicarbonate | 0.05-7.0 |
| Photochromic Pigments | 0.01-25% |
| Acticide B20 | 0.05-0.25 |

Example 2

Slime Activator Compositions

A number of slime compositions were produced, as detailed in Tables 8-18 below. Each of these compositions was produced by first adding deionized water to a clean, dry beaker, and beginning moderate agitation (at a speed of 500 rpm) in a Pete Model BDC250 mixer, available from Caframo Lab Solutions, to mix the contents of the beaker. Next, boric acid was added, and the mixing was continued. The mixing speed was then increased to 900-1000 rpm, and a thickener (either hydroxypropyl methylcellulose or xanthan gum) was added and allowed to mix until it was homogeneous. Next, sodium bicarbonate and sodium chloride were added and the mixing was continued. Next, a dilute solution of sodium hydroxide (2.5% Aq. Solution) was added and the mixing was continued. Finally, Acticide B20 was added and the resultant slime activator composition was mixed until it was homogeneous, and samples were taken to evaluate physical properties such as pH and % solids of the slime activator compositions.

TABLE 8

Example Slime Activator Composition

| Ingredient | Wt. % |
|---|---|
| D.I. Water (conductivity < 10 µs/cm) | 92.7 |
| Boric Acid | 0.5 |
| Hydroxypropyl Methylcellulose (Methocel F4M) | 0.7 |
| Sodium Bicarbonate | 1.4 |
| Sodium Chloride | 0.5 |
| Sodium Hydroxide (2.5% Aq. Soln.) | 4.1 |
| Acticide B20 | 0.1 |
| Total | 100 |

TABLE 9

Example Slime Activator Composition

| Ingredient | Wt. % |
|---|---|
| D.I. Water (conductivity < 10 µs/cm) | 92.9 |
| Boric Acid | 0.3 |
| Hydroxypropyl Methylcellulose (Methocel F4M) | 0.7 |
| Sodium Bicarbonate | 1.4 |
| Sodium Chloride | 0.5 |
| Sodium Hydroxide (2.5% Aq. Soln.) | 4.1 |
| Acticide B20 | 0.1 |
| Total | 100 |

TABLE 10

Example Slime Activator Composition

| Ingredient | Wt. % |
|---|---|
| D.I. Water (conductivity < 10 µs/cm) | 92.5 |
| Boric Acid | 0.5 |
| Hydroxypropyl Methylcellulose (Methocel F4M) | 1 |
| Sodium Bicarbonate | 1.4 |
| Sodium Chloride | 0.5 |
| Sodium Hydroxide (2.5% Aq. Soln.) | 4 |
| Acticide B20 | 0.1 |
| Total | 100 |

TABLE 11

Example Slime Activator Composition

| Ingredient | Wt. % |
|---|---|
| D.I. Water (conductivity < 10 µs/cm) | 90 |
| Boric Acid | 0.5 |
| Hydroxypropyl Methylcellulose (Methocel F4M) | 0.5 |
| Sodium Bicarbonate | 1.4 |
| Sodium Chloride | 0.5 |
| Sodium Hydroxide (2.5% Aq. Soln.) | 7 |
| Acticide B20 | 0.1 |
| Total | 100 |

TABLE 12

Example Slime Activator Composition

| Ingredient | Wt. % |
|---|---|
| D.I. Water (conductivity < 10 µs/cm) | 89.905 |
| Boric Acid | 0.095 |
| Hydroxypropyl Methylcellulose (Methocel F4M) | 1 |
| Sodium Bicarbonate | 1.4 |
| Sodium Chloride | 0.5 |
| Sodium Hydroxide (2.5% Aq. Soln.) | 7 |
| Acticide B20 | 0.1 |
| Total | 100.00 |

TABLE 13

Example Slime Activator Composition

| Ingredient | Wt. % |
|---|---|
| D.I. Water (conductivity < 10 µs/cm) | 90.405 |
| Boric Acid | 0.095 |
| Xanthan Gum | 0.5 |
| Sodium Bicarbonate | 1.4 |
| Sodium Chloride | 0.5 |
| Sodium Hydroxide (2.5% Aq. Soln.) | 7 |
| Acticide B20 | 0.1 |
| Total | 100.00 |

TABLE 14

Example Slime Activator Composition

| Ingredient | Wt. % |
| --- | --- |
| D.I. Water (conductivity < 10 µs/cm) | 92.905 |
| Boric Acid | 0.095 |
| Xanthan Gum | 1 |
| Sodium Bicarbonate | 1.4 |
| Sodium Chloride | 0.5 |
| Sodium Hydroxide (2.5% Aq. Soln.) | 4 |
| Acticide B20 | 0.1 |
| Total | 100.00 |

TABLE 15

Example Slime Activator Composition

| Ingredient | Wt. % |
| --- | --- |
| D.I. Water (conductivity < 10 µs/cm) | 93.405 |
| Boric Acid | 0.095 |
| Hydroxypropyl Methylcellulose (Methocel F4M) | 0.5 |
| Sodium Bicarbonate | 1.4 |
| Sodium Chloride | 0.5 |
| Sodium Hydroxide (2.5% Aq. Soln.) | 4 |
| Acticide B20 | 0.1 |
| Total | 100.00 |

TABLE 16

Example Slime Activator Composition

| Ingredient | Wt. % |
| --- | --- |
| D.I. Water (conductivity < 10 µs/cm) | 89.495 |
| Boric Acid | 0.5 |
| Xanthan Gum | 1 |
| Sodium Bicarbonate | 1.4 |
| Sodium Chloride | 0.5 |
| Sodium Hydroxide (2.5% Aq. Soln.) | 7 |
| Acticide B20 | 0.1 |
| Total | 100.00 |

TABLE 17

Example Slime Activator Composition

| Ingredient | Wt. % |
| --- | --- |
| D.I. Water (conductivity < 10 µs/cm) | 92.695 |
| Boric Acid | 0.5 |
| Xanthan Gum | 0.7 |
| Sodium Bicarbonate | 1.4 |
| Sodium Chloride | 0.5 |
| Sodium Hydroxide (2.5% Aq. Soln.) | 4.1 |
| Acticide B20 | 0.1 |
| Total | 100.00 |

TABLE 18

Example Slime Activator Composition

| Ingredient | Wt. % |
| --- | --- |
| D.I. Water (conductivity < 10 µs/cm) | 92.895 |
| Boric Acid | 0.3 |
| Xanthan Gum | 0.7 |
| Sodium Bicarbonate | 1.4 |
| Sodium Chloride | 0.5 |
| Sodium Hydroxide (2.5% Aq. Soln.) | 4.1 |
| Acticide B20 | 0.1 |
| Total | 100.00 |

Example 3

Modified Slime Activator Compositions

Next, using the base formulation described in Table 17 of Example 2 above, modified slime activator compositions were produced, as described in Tables 19-21 below by adding additional additives at room temperature, and mixing together until these were homogeneous.

First, a slime activator composition with sand was prepared by adding sand to the base slime activators of Example 2 in the amounts described in Table 19 below and mixing the sand with the slime activator composition for 30 minutes to ensure homogeneity.

TABLE 19

Slime Activator Composition with Sand

| Ingredient | Amount (grams) |
| --- | --- |
| Slime Activator Composition of Example 2 | 70.0 g |
| Sand | 30.0 g |

Next, a slime activator composition with glow in the dark pigments and glitter was prepared by first adding glow in the dark pigment, specifically a europium doped strontium aluminate and zinc sulfide, and then adding the glitter, commercially available from Meadowbrooks Inventions, to the base slime activators of Example 2 in the amounts described in Table 20 below and mixing the glow in the dark pigment and glitter with the slime activator composition for 30 minutes to ensure homogeneity.

TABLE 20

Slime Activator Composition with Glow in the Dark Pigments and Glitter

| Ingredient | Amount (grams) |
| --- | --- |
| Slime Activator Composition of Example 2 | 90.0 g |
| Glow in the Dark pigment | 5.0 g |
| Glitter | 5.0 g |

Next, a slime activator composition with pearlescent pigments was prepared by adding commercially available pearlescent pigments to the base slime activators of Example 2 in the amounts described in Table 21 below and mixing the pearlescent pigment with the slime activator composition for 30 minutes to ensure homogeneity.

TABLE 21

Slime Activator Composition with Pearlescent Pigment

| Ingredient | Amount (grams) |
| --- | --- |
| Slime Activator Composition of Example 2 | 99.0 g |
| Pearlescent Pigment | 1.0 g |

Example 4

Comparative Testing of Commercially Available Slime Activator Compositions

Chemical analysis was performed on a variety of commercially-available slime activator compositions, as shown in Table 22 below. The slime activator compositions tested included seven different commercially available slime activator compositions. Notably, several of the slime activator compositions tested did not rely on boron containing or liberating compositions. For example, commercially-available slime activator composition no. 3 was found to be a sodium alginate solution, which did not contain Boron. Similarly, commercially-available slime activator composition no. 3 is believed not to rely on boron as its active ingredient. Similarly, commercially-available slime activator composition no. 6 was found to be a saline solution, which did not contain Boron.

TABLE 22

Commercially-Available Slime Activator Compositions

| Slime Activator Composition | pH of Slime Activator Composition | Wt. % Solids | Boron content (ppm, SGS) | Wt. % Boron |
| --- | --- | --- | --- | --- |
| Disclosed in Example 2 above | 8.9-9.3 | 2.0-2.5 | 81.30 | 0.095 |
| Commercial Activator no. 1 | 9.27 | 1.89 | 1340.00 | 1.565806 |
| Commercial Activator no. 2 | 9.34 | 2.3 | 638.00 | 0.74551 |
| Commercial Activator no. 3 | 7.44 | 1.84 | 0 | 0 |
| Commercial Activator no. 4 | 9.21 | 22.16 | 0 | 0 |
| Commercial Activator no. 5 | 8.74 | 1.32 | 289.00 | 0.3377 |
| Commercial Activator no. 6 | 7.34 | 2.16 | 0 | 0 |
| Commercial Activator no. 7 | — | — | 1670.00 | 1.951415 |

Thus, the slime activator compositions of Example 2 surprisingly have substantially higher pHs and/or contain substantially less Boron than commercially-available boron-containing slime activator compositions.

Example 5

Slime Compositions

Next, slime compositions were made using silicon glass beads, by mixing with Elmer's® brand school glue, the slime activator composition of Table 17 of Example 2 above, and deionized water.

TABLE 23

Slime Compositions with Silicon Glass Beads

| Slime Formulation No. | Parts Elmer's® Brand School Glue | Parts Silicon Glass Beads | Parts Slime Activator Composition | Parts Deionized Water |
| --- | --- | --- | --- | --- |
| 1 | 17.4 | 1 | 5.6 | 0 |
| 2 | 10 | 1 | 2.27 | 0 |
| 3 | 5.95 | 1 | 0.79 | 0 |
| 4 | 6.17 | 1 | 0.89 | 2 |
| 5 | 8.93 | 1 | 1 | 1.3 |
| 6 | 9.2 | 1 | 0 | 2.3 |

Surprisingly, even when the silicon glass beads were mixed only with Elmer's® brand school glue and deionized water, without any slime activator composition, the mixture was effective at producing a slime composition. Without intending to be bound by any particular theory, it is believed that the silicon glass beads are effectively able to cross-link the adhesive composition in the Elmer's® brand school glue to produce a slime composition.

Example 6

Slime Activator Compositions for Buttery Texture

Slime activator compositions were made which, when mixed with a polymeric glue or adhesive such as Elmer's® brand school glue, create a slime composition having a smooth, buttery texture. The slime activator compositions are described in Table 24 below.

TABLE 24

Example Slime Activator Formulations for Buttery Textures

| Raw Material | Composition Range (weight %) |
| --- | --- |
| Deionized Water | 35-85 |
| Paper Pulp | 2-30 |
| Glass Beads | 0.05-25 |
| Excipient Composite | 0.1-21 |
| Silicone Emulsion | 5-60 |
| Boric Acid | 0.01-2 |
| Hydroxypropyl methylcellulose | 0.1-15.0 |
| Sodium Bicarbonate | 0.01-13 |
| Sodium Chloride | 0.1-2.5 |
| 2.5% Sodium Hydroxide Aqueous Solution | 0.1-12 |
| Biocide | 0.001-0.3 |

The excipient composite used in the slime activator composition of Table 24 included a cellulose binder, a disintegrant, a glidant, magnesium stearate, colloidal silicon oxide, starch, and talc.

Next, the slime activator compositions of Table 24 above were mixed with Elmer's® brand school glue to produce slime compositions having a smooth, buttery texture. The slime activator compositions were mixed in a ratio of 25-40 grams of slime activator composition to 130 grams of Elmer's® brand Clear School Glue. The texture of these slime compositions was measured with a spreadability machine, which measured the force it took to spread these slime compositions relative to standard slime prepared from a mix of adhesive and contact solution. Specifically, the spreadability machine, which measured the force it took to spread these slime compositions relative to standard slime. The results of these tests are shown in Table 25 below

TABLE 25

Spreadability of Slime Compositions

| Type of Slime Activator | Amount of Slime Activator Composition | Average Force (lbf) |
|---|---|---|
| BIOTRUE ® Contact Solution, available from Bausch + Lomb | 9 mL | 0.89 |
| Activator Composition of Table 24 | 35 g | 0.5 |
| Activator Composition of Table 24 | 25 g | 0.18 |

These test results show that, compared to standard slime, slime compositions made using the slime activator compositions of Table 24 exhibit a smoother, more buttery texture.

Example 7

Slime Activator Compositions for "Iceberg" Slime

Slime activator compositions were made which, when mixed with a polymeric glue or adhesive such as Elmer's® brand school glue, create a slime composition which, when left exposed to air, will form a dried, breakable outer layer which can be cracked to expose a flexible under layer. The slime activator compositions are described in Table 26 below.

TABLE 26

Example Slime Activator Formulations for Iceberg Slime

| Raw Material | Composition Range (weight %) |
|---|---|
| Deionized water | 35-75 |
| Paper Pulp | 2-25 |
| Glass Beads | 0.1-30 |
| Excipient Composite | 0.1-21 |
| Silicone Emulsion | 5-60 |
| Boric Acid | 0.1-2.0 |
| Hydroxypropyl Methylcellulose | 0.1-15 |
| Sodium Bicarbonate | 0.5-13 |
| Sodium Chloride | 0.1-2.5 |
| 2.5% sodium hydroxide aqueous solution | 0.1-12.0 |
| Biocide | 0.001-0.3 |

The excipient composite used in the slime activator composition of Table 26 included a cellulose binder, a disintegrant, a glidant, magnesium stearate, colloidal silicon oxide, starch, and talc.

Next, from about 15 g to about 85 g of the slime activator composition of Table 27 was mixed with 130 g of Elmer's® brand Clear School Glue. In general, it was observed that compositions containing greater amounts of the slime activator composition were more difficult to mix, but exhibited shorter drying time. The resulting slime was left open to the air at room temperature for 24 hours at 50% relative humidity to form a slime composition having a dried surface. The hardness of the resulting slime surface was measured using a puncture force analyzer, which measures the force required to break the dried surface layer of the slime composition. The average force required to break the dried slime composition was 4345.5 F(g), with a standard deviation of 494.7 F(g). Surprisingly, slime prepared from the slime compositions of Table 27 achieved a high maximum force to break the dried outer layer, despite being left to dry significantly less than comparative "iceberg" slime compositions, which often require 72 hours to achieve a dried outer layer.

Example 8

Slime Activator Compositions for Fluffy Texture

Slime activator compositions were made which, when mixed with a polymeric glue or adhesive such as Elmer's® brand Clear School Glue, create a slime composition having squeezable fluffy texture when squeezed through fingers. These slime activator compositions are described in Table 27 below.

TABLE 27

Example Slime Activator Formulations for Fluffy Slime

| Raw Material | Composition Range (weight %) |
|---|---|
| Deionized water | 60-89 |
| Steric acid | 2-35 |
| Ethal ® Laureth-23 (5.46% Aqueous Solution) | 0.01-2 |
| Sodium Lauryl Sulfate (1.735% Aqueous Solution) | 0.1-3.0 |
| Triton ™ X-100 | 0.01-10.0 |
| Triethanolamine | 0.01-3.0 |
| Boric Acid | 0.01-2 |
| Hydroxypropyl Methylcellulose | 0.1-15 |
| Sodium Bicarbonate | 0.01-13 |
| Sodium Chloride | 0.1-2.5 |
| 2.5% Sodium Hydroxide Aqueous Solution | 0.1-12 |
| Biocide | 0.001-0.3 |

Next, from about 25 g to about 60 g of the slime activator compositions of Table 27 and Table 1 was added to 130 g of Elmer's® brand Clear School Glue. The squeezability of the resulting slime composition was measured using a specially designed squeezability apparatus, which measured the amount of work required to pass a grate having spaces of 1 cm±0.75 cm, approximately equivalent in size to that of a human hand/fingers, through the slime composition. This squeezability apparatus measured the force required to squeeze a standard volume of this slime composition, as well as the work performed to carry out this action, and the elastic modulus of the slime composition. The results of these tests are shown in Table 29 below.

TABLE 28

Squeezability of Slime Compositions

| Type of Slime Activator | Amount of Slime Activator Composition (g) | Maximum Squeeze Force (lbf/in) | Young's Modulus (lbf-in/in$^3$) | Work (lbf-ft) |
|---|---|---|---|---|
| BIOTRUE ® Contact Solution | 0 | 114.63 | 35881.35 | 2.99 |
| Activator Composition of Table 1 | 60 | 125.24 | 34235.06 | 3.36 |
| Activator Composition of Table 27 | 25 | 75.42 | 18802.2 | 2.42 |

These results show that slime compositions made using the slime activator composition of Table 28 are, in fact, easier to squeeze than comparative slime compositions prepared using either contact lens solution or prior slime activator compositions.

It will be apparent to those skilled in the art that various modifications and variations can be made to the present disclosure without departing from the spirit and scope of embodiments of the disclosure. Thus, it is intended that the described embodiments cover the modifications and variations of the disclosure provided they come within the scope of the appended claims and their equivalents.

What is claimed is:

1. A slime activator composition, comprising:
a borate ion containing/liberating compound, solution, or salt present in an amount of from about 0.005 percent, by weight, to about 0.25 percent, by weight or a phosphate ion containing/liberating compound, solution, or salt present in an amount of from about 0.005 percent, by weight, to about 5 percent, by weight;
hydroxypropyl methylcellulose;
a buffer present in an amount effective to maintain a pH of the composition in a range of from about 8.7 to about 9.5; and
at least one of:
steric acid present in an amount of from about 2 percent by weight to about 35 percent by weight, and
lignocellulosic fibrous material present in an amount of from about 2 percent by weight to about 30 percent by weight,
wherein the slime activator is configured to crosslink with a polyvinyl acetate-based glue or a polyvinyl alcohol-based glue and thereby form a slime composition.

2. The composition of claim 1, wherein the composition comprises a borate ion containing/liberating compound, solution, or salt and the borate ion containing/liberating compound, solution, or salt is boric acid, sodium borate, sodium tetraborate, disodium tetraborate, sodium tetraborate decahydrate, or any combinations thereof.

3. The composition of claim 1, further comprising a biocide.

4. The composition of claim 1, wherein the buffer comprises sodium bicarbonate or sodium hydrogen phosphate.

5. The composition of claim 1, further comprising glass beads present in an amount of from about 0.05 percent by weight to about 25 percent by weight.

6. The composition of claim 1, further comprising glass beads present in an amount of from about 0.1 percent by weight to about 30 percent by weight.

7. The composition of claim 1, further comprising a silicone emulsion present in an amount of from about 5 percent by weight to about 60 percent by weight.

8. The composition of claim 1, further comprising an excipient composite present in an amount of from about 0.1 percent by weight to about 21 percent by weight.

9. The composition of claim 1, further comprising one or more surfactants present in an amount of from about 0.21 percent by weight to about 15 percent by weight.

10. The composition of claim 9, wherein the one or more surfactants comprise polyoxyethers of lauryl alcohol, sodium lauryl sulfate, a non-ionic surfactant, or any combination thereof.

11. The composition of claim 1, wherein the composition meets the Art and Creative Materials Institute, Inc. (ACMI) certification standards as non-toxic for use in a children's product.

12. A kit, comprising:
the slime activator composition of claim 1; and
a polyvinyl acetate-based glue/adhesive or a polyvinyl alcohol-based glue/adhesive.

13. A method of making a slime composition, comprising:
combining the slime activator composition of claim 1 with a polyvinyl acetate-based glue/adhesive or a polyvinyl alcohol-based glue/adhesive.

14. A method of making a slime activator composition, comprising:
combining a borate ion containing/liberating compound, solution, or salt in an amount of from about 0.005 percent, by weight, to about 0.25 percent, by weight or a phosphate ion containing/liberating compound, solution, or salt in an amount of from about 0.005 percent, by weight, to about 5 percent, by weight, with:
hydroxypropyl methylcellulose;
a buffer in an amount effective to maintain a pH of the composition in a range of about 8.7 to about 9.5; and
at least one of:
steric acid present in an amount of from about 2 percent by weight to about 35 percent by weight, and
lignocellulosic fibrous material present in an amount of from about 2 percent by weight to about 30 percent by weight, to form a slime activator composition configured to crosslink with a polyvinyl acetate-based glue/adhesive or a polyvinyl alcohol-based glue/adhesive, and thereby form a slime composition.

15. The method of claim 14, wherein the method comprises combining the borate ion containing/liberating compound, solution, or salt with a buffer, and wherein the borate ion containing/liberating compound, solution, or salt is boric acid, sodium borate, sodium tetraborate, disodium tetraborate, sodium tetraborate decahydrate, or any combinations thereof.

16. The method of claim 14, wherein the method comprises combining the borate ion containing/liberating compound, solution, or salt or the phosphate ion containing/liberating compound, solution, or salt, with a biocide.

17. The method of claim 14, wherein the buffer comprises sodium bicarbonate or sodium hydrogen phosphate.

18. The method of claim 14, further comprising combining the borate ion containing/liberating, compound, solution, or salt or the phosphate ion containing/liberating compound, solution, or salt, hydroxypropyl methylcellulose, and buffer with glass beads in an amount of from about 0.1 percent by weight to about 30 percent by weight.

19. The method of claim 14, further comprising combining the borate ion containing/liberating, compound, solution, or salt or the phosphate ion containing/liberating compound, solution, or salt, hydroxypropyl methylcellulose, and buffer with an excipient composite in an amount of from about 0.1 percent by weight to about 21 percent by weight.

20. The method of claim 14, further comprising combining the borate ion containing/liberating, compound, solution, or salt or the phosphate ion containing/liberating compound, solution, or salt, hydroxypropyl methylcellulose, and buffer with a silicone emulsion in an amount of from 5 percent by weight to about 60 percent by weight.

21. The method of claim 14, further comprising combining the borate ion containing/liberating, compound, solution, or salt or the phosphate ion containing/liberating compound, solution, or salt, hydroxypropyl methylcellulose, and buffer with one or more surfactants in an amount of from about 0.21 percent by weight to about 15 percent by weight.

22. The method of claim 14, wherein the one or more surfactants comprise polyoxyethers of lauryl alcohol, sodium lauryl sulfate, a non-ionic surfactant, or any combination thereof.

23. The method of claim 14, wherein the slime activator composition is configured to be combined with the glue/adhesive in a weight ratio of the slime activator composition to the glue/adhesive of from about 0.18:1 to about 1.5:1 to produce a slime composition.

24. The method of claim 14, wherein the composition is Art and Creative Materials Institute, Inc. (ACMI) certified as non-toxic for use in a children's product.

\* \* \* \* \*